E. P. DUMANOIS.
CARBURETED AIR DISTRIBUTER FOR EXPLOSION ENGINE STARTERS.
APPLICATION FILED SEPT. 22, 1919.
1,396,322. Patented Nov. 8, 1921.
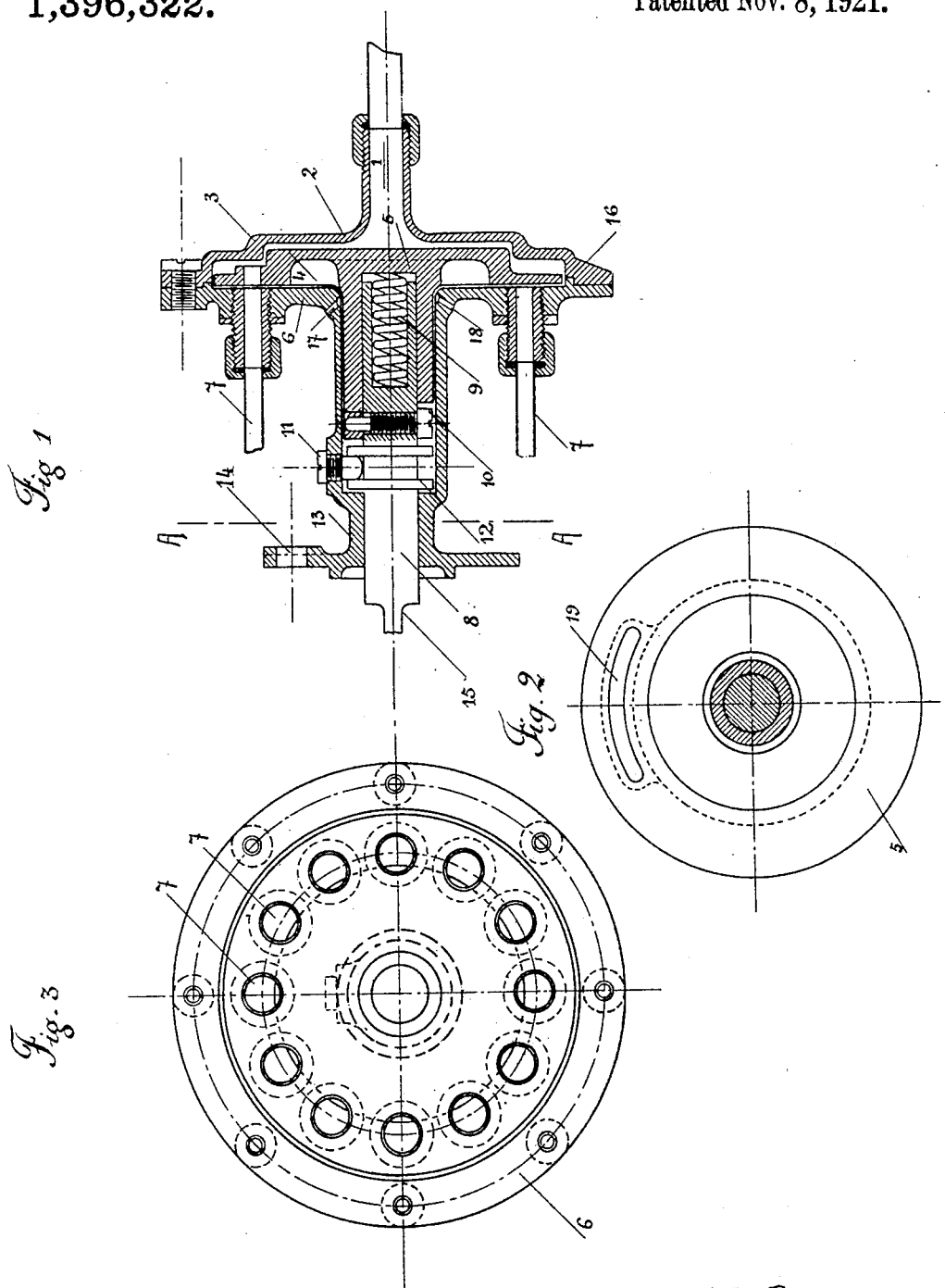
INVENTOR:
Emile Paul Dumanois
BY Wm Wallace White
ATTY.

UNITED STATES PATENT OFFICE.

EMILE PAUL DUMANOIS, OF LEVALLOIS-PERRET, FRANCE.

CARBURETED-AIR DISTRIBUTER FOR EXPLOSION-ENGINE STARTERS.

1,396,322. Specification of Letters Patent. Patented Nov. 8, 1921.

Application filed September 22, 1919. Serial No. 325,587.

*To all whom it may concern:*

Be it known that I, EMILE PAUL DUMANOIS, 71 Rue Danton, Levallois-Perret, Seine, France, citizen of the Republic of France, residing at 71 Rue Danton, Levallois-Perret, Seine, France, have invented certain new and useful Improvements in Carbureted-Air Distributers for Explosion-Engine Starters, of which the following is a specification.

It is indispensable to be able to start explosion and combustion motors by one or other mechanical means, when the bore of the cylinders or their number is such that starting by hand is no longer possible. This question is of special interest for motors mounted on flying machines or on boats.

To insure starting it is sufficient to convey into a certain number of cylinders a suitable mixture, carbureted with gaseous or liquid fuel and at a sufficient pressure to secure sufficiently numerous and powerful consecutive explosions caused by an electric spark or any other means.

The purpose of the present invention is to provide a distributer enabling the carbureted gas to be thus forwarded under pressure and further enabling a sufficient tightness of the slide-valve of the distributer to be secured while avoiding unnecessary grinding and friction.

The annexed drawings illustrate an example of a construction of the invention.

Figure 1 represents an axial section of a device of the above kind for a 12-cylinder motor.

Fig. 2 is a front view of the fixed part of the distributer.

Fig. 3 is a front view of the movable part only of the distributer.

1 indicates the inlet for the carbureted air, which inlet opens into a closed chamber in two parts connected by an airtight joint 16. One of these parts 2 is turned inward along a cylindrical surface 3, to a diameter slightly greater than that of a cylindrical protuberance 4 of the circular slide 5 in such a way as to avoid any contact and consequently friction while the other part 6 has on its periphery equidistant orifices prolonged by tubes 7 of which the centers lie along a circle concentric with the distributer. Each of these orifices is in communication with a cylinder by means of a conduit and an automatic valve: they are successively arranged on the part 6 in the order of ignition in the direction of the working.

The circular slide 5 is mounted with slight friction on a shaft 8 which contains a spring 9 tending to repel the slide, the course of which is limited in this direction by a screw 10. The cylindrical part of the distributer mounted on the shaft has an outer diameter slightly less than the corresponding inner diameter of the part 6, so that there is no contact. On the other hand, the flat surfaces of the slide 5 and the part 6 opposite one another are so as to allow as complete a contact as possible by the sliding of the distributer on its shaft by compressing the spring 9. A screw 11 forms a stop between the collars 12 of the shaft which is supported in the bearing 13. 14 indicates the clamp for attachment to the frame of the motor.

The shaft is driven through the turnscrew 15 actuated by the cam shaft or by a member rotating at half the speed of the crankshaft for a four-stroke motor or at its full speed for a two-stroke motor.

17 and 18 indicate holes opening into a circular channel inside the casing and placing the latter in communication with the atmosphere.

The slide, the dressed surface of which is shown in Fig. 2, can be applied against the corresponding surface of the part 6 and has an opening 19 of sufficient extent to uncover a suitable number of the orifices 7, three for instance. Further the adjustment of the shaft of the distributer in relation to the motor is such that the cylinders corresponding to the uncovered orifices are in the position for successive ignition and suitably positioned in relation to the sparking periods to obtain a sufficient number of consecutive explosions. Lastly, the slide is so constructed as to be balanced as perfectly as possible around its shaft, taking into account the space 19.

The working is as follows:—

When the carbureted air under pressure enters through 1, it produces a shock on the face of the cylindrical protuberance 4 of the slide, and then flows into the annular cylindrical space provided between 4 and 3 altering its direction, causing reaction on the slide. The effects of this shock and reaction combine to cause the slide to move against the dressed face of 6 by sliding on the shaft 8 while compressing the spring 9. The carbureted air then flows through the orifice 19 and the holes 7 which correspond with the cylinders suitable for a proper ignition while raising the automatic valves.

As soon as the flow of carbureted air creases, the pressure in the device falls rapidly, from the fact of the small leakages which occur between the flat surfaces of 5 and 6 and which promotes communication with the atmosphere through the holes 17 and 18. The spring 9 then draws back the plate 5 and restores it to its original position which it occupies when at rest during the whole time of the rotation of the motor.

It can be seen that during the whole time of the rotation of the motor there is no contact and no frictional strain between the different parts which are at the moment of starting in the carbureted air under pressure.

Thus gripping which might be produced by the de-lubricating of the parts by the flow of the carbureted air is avoided, as well as the inconvenience which could result from the introduction of oil into the cylinders owing to an excess of lubrication.

The play provided between the outer cylindrical part of the slide which slides on the shaft and its casing prevents any unnecessary friction. Finally, the oil conveyed arising from the lubrication of the bearing 13 and of the stop-collars 12 is stopped by the circular channel with which the hole 18 communicates and flows through this orifice out of the distributer.

Having now described my invention what I claim as new and desire to secure by Letters Patent is:—

1. A distributer of carbureted air under pressure for internal combustion engines, comprising a shaft, means operated from the engine for driving said shaft, a casing having an inlet opening and a flat seat provided with a number of outlet openings disposed on a circle concentric with the shaft, means for connecting said outlet openings to the respective cylinders of an explosion engine, in a suitable order, a valve adapted to control said outlet openings, said valve being mounted slidably on the shaft, means for driving the valve by the shaft, means for permitting a small longitudinal movement of said valve, means whereby the valve is tightly forced against its seat by the carbureted air flowing under pressure into the casing and means for normally maintaining the valve away from its seat.

2. A distributer of carbureted air under pressure for internal combustion engines, comprising a shaft, means for driving said shaft, a casing having a central inlet opening and a flat seat provided with a number of outlet openings disposed on a circle concentric with the shaft, means for connecting said outlet openings to the respective cylinders of an explosion engine, in a suitable order, a rotary disk valve mounted slidably on the shaft in the space between the inlet opening and the said seat and provided with one opening adapted to control a certain number of said outlet openings at the same time, said disk valve being adapted to be moved axially against its seat by the pressure of the carbureted air, yielding means for normally maintaining the disk valve away from its seat and means operated from the engine and adapted to drive the valve.

3. A distributer of carbureted air under pressure for internal combustion engines, comprising a shaft, means for driving said shaft, a casing having a central inlet opening and a flat seat provided with a number of outlet openings, disposed on a circle concentric with the shaft, means for connecting said outlet openings to the respective cylinders of an explosion engine, in a suitable order, a rotary disk valve mounted slidably on the shaft in the space between the inlet opening and the said seat and provided with one opening adapted to control a certain number of said outlet openings at the same time, said disk valve being adapted to be moved axially against its seat by the pressure of the carbureted air, a spring the end of which is adapted to bear against the disk valve for normally maintaining the disk valve away from its seat, and means operated from the engine and adapted to drive the valve.

In testimony whereof I have signed my name to this specification.

EMILE PAUL DUMANOIS.